United States Patent
Nakamura et al.

(10) Patent No.: US 6,281,613 B1
(45) Date of Patent: Aug. 28, 2001

(54) AC GENERATOR HAVING SPEED LIMIT MEANS

(75) Inventors: Shigenobu Nakamura, Anjo; Tsutomu Shiga, Nukata, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/396,475

(22) Filed: Sep. 15, 1999

(30) Foreign Application Priority Data

Sep. 16, 1998 (JP) .................................................. 10-261237

(51) Int. Cl.⁷ .................................................... H02K 1/00
(52) U.S. Cl. .............................. 310/181; 310/78; 310/263
(58) Field of Search .......................... 310/78, 181, 261, 310/263; 74/336 R; 192/104 R; 464/89, 160

(56) References Cited

U.S. PATENT DOCUMENTS

| 3,747,731 | * | 7/1973 | Smirl ................ 192/104 R |
| 3,941,225 | * | 3/1976 | Shiber ............... 192/104 C |
| 3,955,097 | * | 5/1976 | Hobo et al. ......... 290/40 R |
| 4,080,843 | * | 3/1978 | Underwood ........ 74/336 R |
| 4,482,830 | * | 11/1984 | Iwaki et al. ........ 310/113 |
| 4,654,551 | * | 3/1987 | Farr ................... 310/112 |
| 4,917,225 | * | 4/1990 | Diehl et al. ........ 192/82 T |
| 4,959,577 | | 9/1990 | Radomski ........... 310/263 |
| 5,096,035 | * | 3/1992 | Bradfield ........... 192/104 B |
| 5,483,116 | * | 1/1996 | Kusase et al. ...... 310/263 |
| 5,536,987 | * | 7/1996 | Hayashi et al. .... 310/263 |
| 5,543,676 | * | 8/1996 | York et al. ......... 310/263 |
| 5,663,605 | * | 9/1997 | Evans et al. ....... 310/181 |
| 5,780,953 | * | 7/1998 | Umeda et al. ..... 310/181 |
| 5,788,576 | * | 8/1998 | Varin ................. 464/83 |

FOREIGN PATENT DOCUMENTS

| 49-140589 | 9/1974 | (JP) . |
| 5-64394 | 3/1993 | (JP) . |
| 2548882 | 8/1996 | (JP) . |
| 8-205497 | 8/1996 | (JP) . |
| 9-107697 | 4/1997 | (JP) . |

* cited by examiner

*Primary Examiner*—Nicholas Ponomarenko
*Assistant Examiner*—Joseph Waks
(74) *Attorney, Agent, or Firm*—Pillsbury Winthrop LLP

(57) ABSTRACT

An AC generator for charging a vehicle battery has a stator having a stator winding, a rotor having a field coil and auxiliary permanent magnets, a pulley, and a clutch disposed between the pulley and the rotor. The clutch limits rotation speed to be transmitted from the pulley to the rotor within a set rotation speed.

7 Claims, 4 Drawing Sheets

AC GENERATOR HAVING SPEED LIMIT MEANS

CROSS REFERENCE TO RELATED APPLICATION

The present application is based on and claims priority from Japanese Patent Applications Hei 10-261237, filed Sep. 16, 1998, the contents of which are incorporated herein by reference.

BACKGROUND OF THE INVENTION

1. Field of the Invention

The present invention relates to an AC generator for a vehicle and, particularly, to an AC generator which has a device for limiting the rotation speed thereof.

2. Description of the Related Art

An AC generator disclosed in JP-A-9-107697 is provided with auxiliary permanent magnets between pole pieces in addition to a field coil so that a minimum output current can be generated even when the field coil is not energized. This AC generator has to have a bridge circuit composed of four switching element to increase the field current at lower rotation speeds and reduces the same at higher rotation speeds. However, this kind of bridge circuit is comparatively expensive and generates considerable heat. Accordingly, it is difficult to provide a compact AC generator having such a bridge circuit therein.

SUMMARY OF THE INVENTION

A main object of the invention is to provide an improved AC generator which solves the above problems.

According to a preferred embodiment of the invention, an AC generator includes a stator having a stator winding, a rotor having a field coil, a pulley for transmitting engine rotation to the rotor, a voltage regulator, and a clutch, disposed between the pulley and the rotor, for limiting rotation speed to be transmitted from the pulley to the rotor within a set rotation speed. The rotor also has a permanent magnet for supplying auxiliary magnetic flux to the stator winding. The permanent magnets generate lower output voltage than the terminal voltage of the battery when the field coil is not energized.

Preferably, the set rotation speed is between two third of the engine maximum speed and the engine idling speed.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
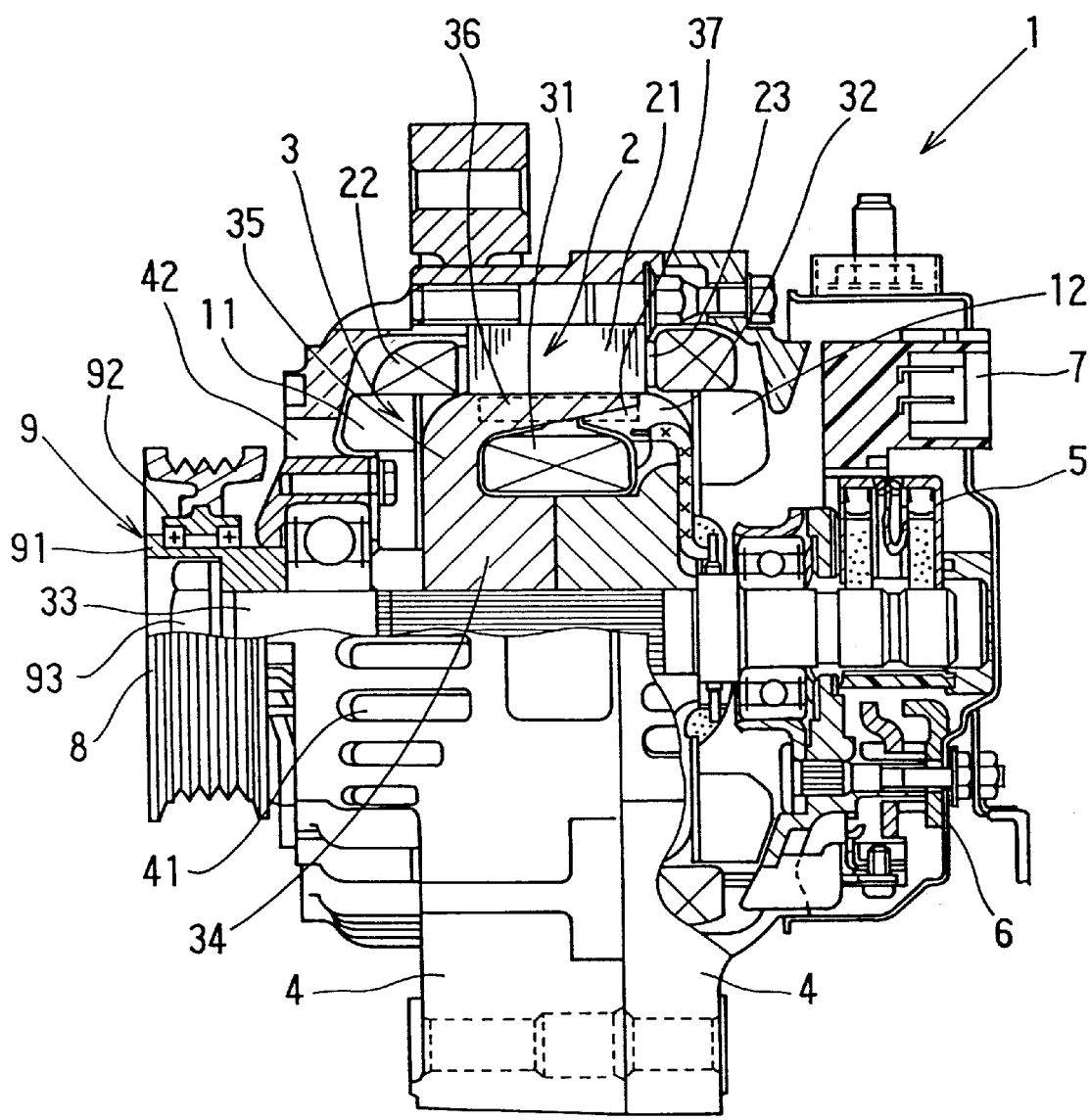
FIG. 1 is a cross-sectional view illustrating an AC generator for a vehicle according to a preferred embodiment of the invention.

In FIG. 1, an AC generator according to a preferred embodiment of the invention includes stator 2, rotor 3, frame 4, brush unit 5, rectifier unit 6, voltage regulator 7, pulley 8 and clutch 9.

Stator 2 has stator core 21, three-phase stator winding 22, and insulators 23 disposed between stator core 21 and stator winding 22. Stator core 21 is a cylindrical lamination of thin steel sheets and has a plurality of slots at the inner periphery thereof to accommodate stator winding 22.

Rotor 3 has a cylindrical field coil 31, a pair of front and rear pole cores 32 respectively having six claw poles 36 which enclose field coil 31, and shaft 33. Front pole core 32 has mixed-flow-type cooling fan 11 welded to the front surface thereof, and rear pole core has centrifugal cooling fan 12 welded to the rear surface thereof.

Each of pole cores 32 has disk portion 34, yoke portion 35, six claw poles 36, and permanent magnets 37 disposed between claw poles 36. Permanent magnets 37 are fixed to pole cores by adhesive or a magnet holder, and magnetized to increase the effective magnetic flux supplied to stator 2.

Frame 4 accommodates stator 2 and rotor 3 so that rotor 3 can rotate about shaft 33 inside stator 2. Frame 4 has air-discharge vents 41 at portions opposite the coil ends of stator winding 22 and air intake vents 42 at the axial ends thereof. Rectifier unit 6 which converts AC power to DC power has a plurality of rectifying elements soldered to heat sinks. Voltage regulator 7 controls field current supplied to field coil 31 in a well-known manner. Pulley 8 transmit engine rotation to rotor 3 via clutch 9 and shaft 33.

Clutch 9 is composed of clutch inner member 91 and clutch outer member 92. Clutch inner member 91 is fixed to the front end of shaft 33 by a nut, and clutch outer member 92 is fixed to the inner periphery of pulley 8. Clutch outer member 92 and clutch inner member 91 rotate in a unit when clutch outer member 92 rotates slower than a set rotation speed R1. However, clutch inner member 91 slips and maintains the set rotation speed when clutch outer member 92 rotates faster than the set speed R1.

Permanent magnets 37 are designed so that field coil 31 with the maximum field current and permanent magnets in combination can provide a desired output power.

Figure 2:
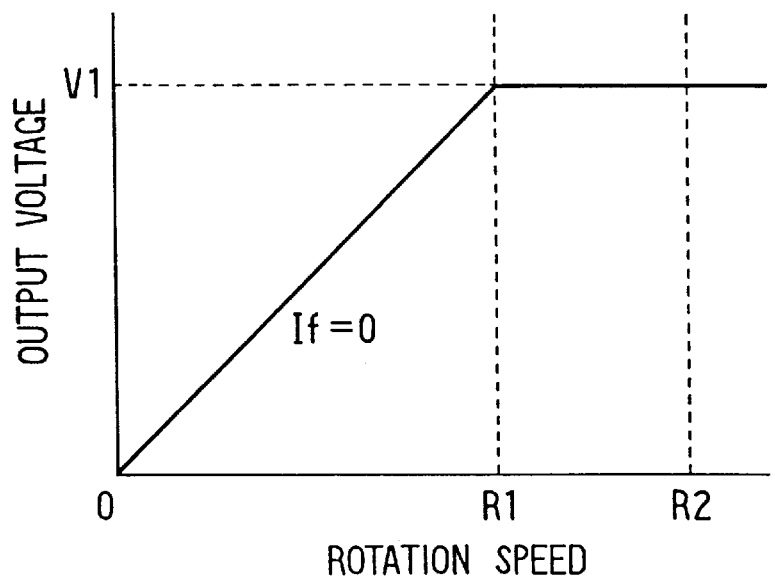
FIG. 2 is a graph showing an output characteristic of the AC generator according to the preferred embodiment.

If the field coil 31 is not energized with field current, that is, if stator winding 22 is supplied with auxiliary magnetic flux only by permanent magnets 37, then AC generator 1 provides output voltage proportional to the rotation speed as shown in FIG. 2. In this situation, the output voltage becomes battery charging voltage V1 at a set speed R1. However, the output voltage does not become higher than the battery charging voltage V1 because the clutch inner member 91 does not rotate higher than the set rotation speed R1.

Figure 3:
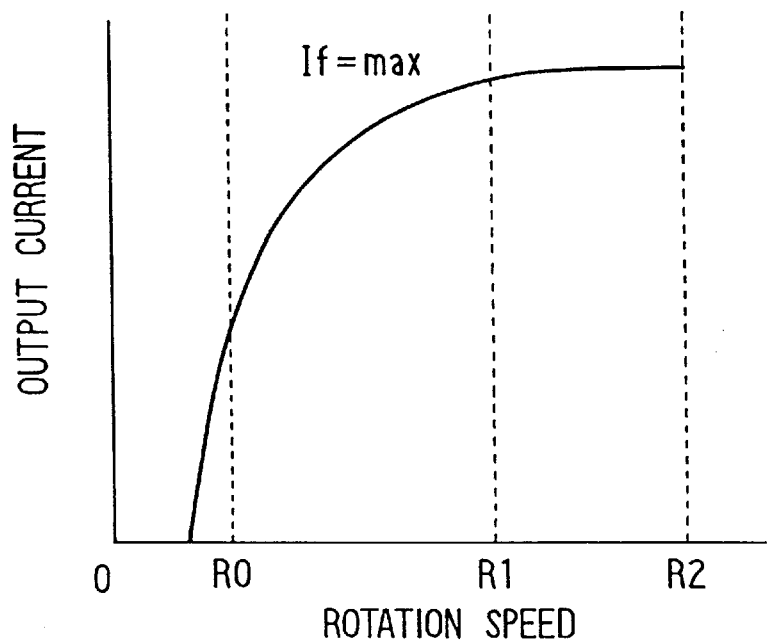
FIG. 3 is a graph showing an output characteristic of the AC generator according to the preferred embodiment of the present invention.

As shown in FIG. 3, the set rotation speed R1 is about two third of the maximum rotation speed R2, where the output current of AC generator almost flattens. For example, the set rotation speed is about 10,000 r.p.m. (that is, 6000×2.5×2/3 r.p.m.) if the maximum engine rotation speed R2 is 6,000 r.p.m. and the pulley ratio is 2.5. It is noted that the engine rotation speed R2 in FIGS. 2 and 3 corresponds to the maximum rotation speed in the ordinary operation.

Figure 4:
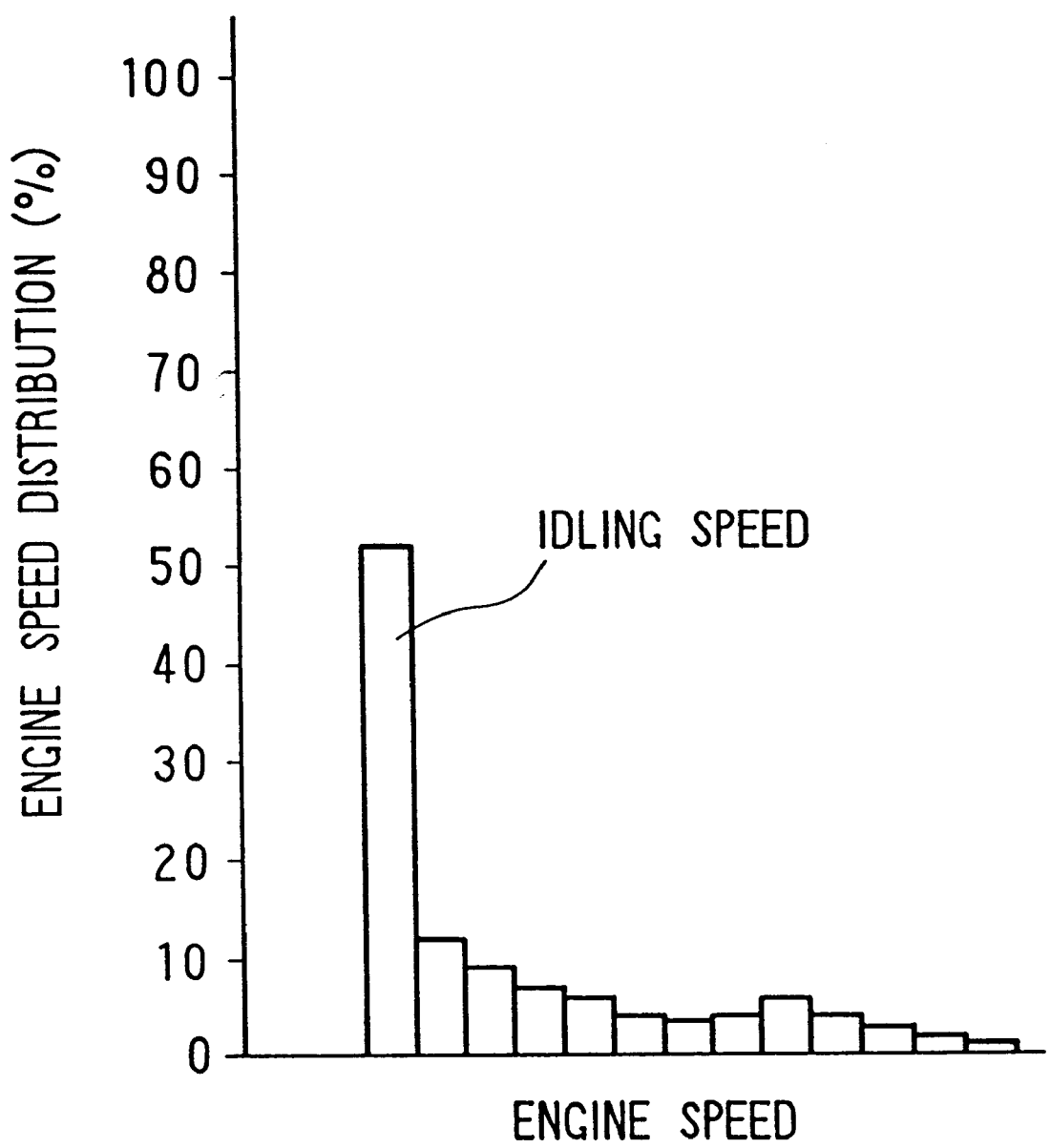
FIG. 4 is a graph showing engine speed distribution in the vehicle town-drive.

As shown in FIG. 4, the frequency ratio of the engine idling speed in the town drive is more than 50%.

The ratio of the set rotation speed R1 is found optimum in view of the frequency ratio, temperature rise and the life of the parts and components of AC generator 1. Rotation speed R0 corresponds to the engine idling speed.

Figure 5:
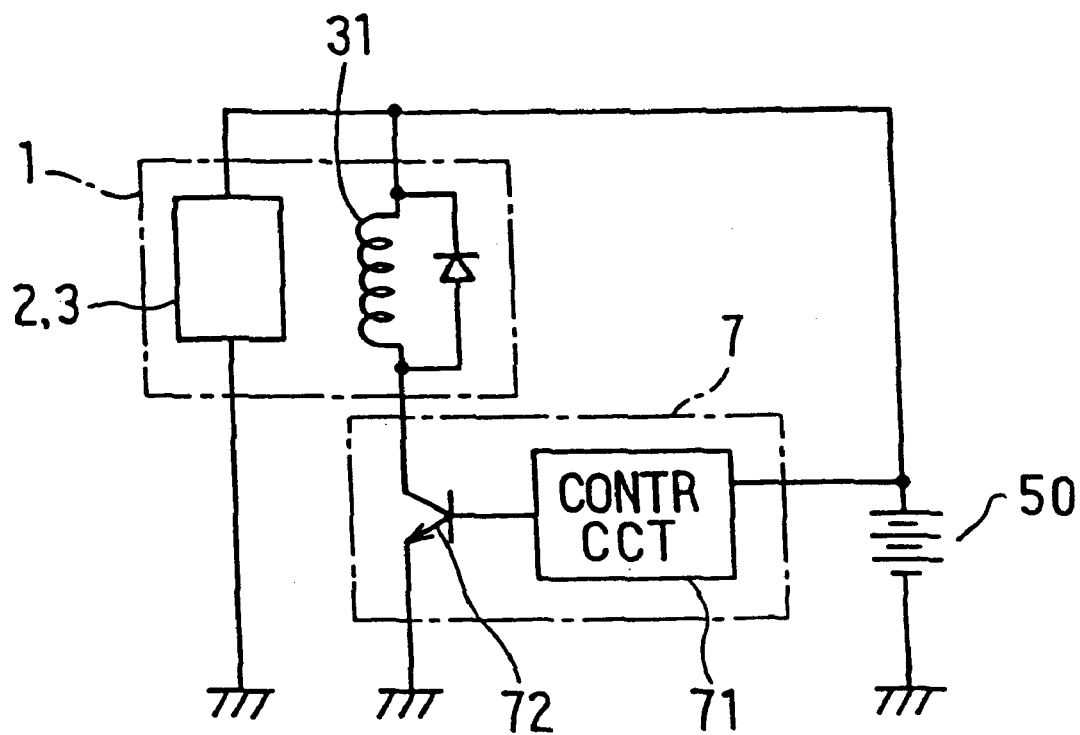
FIG. 5 is a schematic diagram illustrating a battery charging system including the AC generator according to the preferred embodiment.

As shown in FIG. 5, voltage regulator 7 has control circuit 71 and power transistor 72, which controls the field current in a one-way direction. This can omit a complicated control system that supplies current in the opposite direction to decrease the magnetic flux at a high speed.

For example, the maximum rotation speed of rotor 3 may be set between the engine maximum speed and the engine idling speed. In any event, the number, size and characteristics of permanent magnets 37 should be designed so that the output voltage can be equal to the battery voltage when the field current is zero. However, it is possible to design the permanent magnets so that the output voltage is lower than the voltage of the battery 50 with the field current being zero if the permanent magnet assures the desired output power with the field current being maximum.

The permanent magnets are preferably disposed between the poles having different magnetic polarity. That is, the permanent magnets may be disposed at the following portions: circumferential sides of the claw poles; the axial ends of the claw poles; or spaces in parallel with the field coil.

Clutch 9 can be replaced with a different type clutch such as a clutch that slips at a prescribed speed or a clutch having a reduction mechanism whose reduction ratio changes as the rotation speed changes.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An AC generator for charging a vehicle battery comprising:

a stator having a stator winding;

a rotor having a pair of pole cores with a plurality of claw poles extending axially, a cylindrical field coil enclosed by said claw poles for supplying a magnetic flux to said stator winding, and a plurality of permanent magnets respectively disposed between said claw poles for increasing said magnetic flux supplied to said stator winding;

a pulley for transmitting engine rotation to said rotor;

a voltage regulator for regulating an output voltage by controlling a field current supplied to said field coil; and means, disposed between said pulley and said rotor, for limiting a rotation speed to be transmitted from said pulley to said rotor within a set rotation speed, wherein said permanent magnets supply an auxiliary magnetic flux to said stator winding to generate in output voltage that is equal to or lower than a voltage of the battery when said field current is not supplied and said rotor is in said set rotation speed.

2. An AC generator as claimed in claim 1, wherein said set rotation speed is between a maximum speed and an idling speed of said engine.

3. An AC generator as claimed in claim 1, wherein said rotation speed is between two thirds of a maximum speed and an idling speed of said engine.

4. An AC generator as claimed in claim 1, wherein said set rotation speed is a speed at which said output voltage is the same as a voltage of the battery when said field current is not supplied.

5. An AC generator for charging a vehicle battery comprising:

a stator having a stator winding;

a rotor having a plurality of claw poles extending axially, a cylindrical field coil enclosed by said claw poles for supplying a main magnetic flux to said stator winding, and a plurality of permanent magnets disposed between said claw poles for supplying an auxiliary magnetic flux to said stator winding;

a pulley for transmitting engine rotation to said rotor voltage regulator for regulating an output voltage by controlling a field current supplied to said field coil; and means, disposed between said pulley and said rotor, for limiting a rotation speed to be transmitted from said pulley to said rotor within a set rotation speed wherein said auxiliary magnetic flux is limited so that said stator winding generates an output voltage that is equal to or lower than a terminal voltage of said battery when said field current is not supplied and said rotor is in said set rotation speed.

6. An AC generator for charging a vehicle battery comprising:

a stator having a stator core and a stator winding;

a rotor having a field coil, a pair of pole cores magnetized to opposite polarities by said field coil, and a permanent magnet disposed between said pole cores;

a voltage regulator for regulating an output voltage of said stator winding by controlling a field current supplied to said field coil; and a clutch for limiting a rotation speed of said rotor below a set rotation speed, wherein said permanent mallet supplies an auxiliary magnetic flux to generate said output voltage which is equal to or lower than a voltage of said battery when said field current is not supplied and said rotor is in said set rotation speed.

7. An AC generator as claimed in claim 6, wherein said output voltage is equal to the voltage of said battery when said field current is not supplied and said rotor is in said set rotation speed.

* * * * *